(12) United States Patent
Nunez et al.

(10) Patent No.: US 8,807,745 B2
(45) Date of Patent: Aug. 19, 2014

(54) FULLY POLYMERIZED UV BLOCKING SILICONE HYDROGEL LENS

(75) Inventors: Ivan Nunez, Penfield, NY (US); Jennifer Hunt, Batavia, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 13/480,648

(22) Filed: May 25, 2012

(65) Prior Publication Data

US 2013/0314663 A1    Nov. 28, 2013

(51) Int. Cl.
*G02B 1/00*    (2006.01)

(52) U.S. Cl.
USPC .................. 351/159.33; 523/106; 264/1.32

(58) Field of Classification Search
USPC .............. 351/159.24, 159.29, 159.33, 159.34
See application file for complete search history.

(56) References Cited

U.S. PATENT DOCUMENTS

| 3,808,179 | A | 4/1974 | Gaylord |
| 5,070,215 | A | 12/1991 | Bambury et al. |
| 5,135,965 | A | 8/1992 | Tahan |
| 5,610,252 | A | 3/1997 | Bambury et al. |
| 6,921,802 | B2 | 7/2005 | Kunzler et al. |
| 7,461,937 | B2 | 12/2008 | Steffen et al. |
| 2005/0148682 | A1* | 7/2005 | Hu et al. ................ 523/106 |
| 2006/0072069 | A1 | 4/2006 | Laredo et al. |
| 2008/0174035 | A1* | 7/2008 | Winterton ............. 264/1.36 |
| 2012/0026457 | A1* | 2/2012 | Qiu et al. .............. 351/160 H |
| 2013/0313733 | A1 | 11/2013 | Nunez et al. |
| 2013/0314664 | A1 | 11/2013 | Nunez et al. |

FOREIGN PATENT DOCUMENTS

| WO | 03/022322 A2 | 3/2003 |
| WO | 2007/146137 A2 | 12/2007 |

OTHER PUBLICATIONS

International Search Report in corresponding International Application No. PCT/US2013/041749 mailing date Jul. 24, 2013 (3 pages).
Written Opinion of the International Searching Authority in corresponding International Application No. PCT/US2013/041749, mailing date Jul. 24, 2013 (4 pages).

* cited by examiner

*Primary Examiner* — Ricky Mack
*Assistant Examiner* — William Alexander
(74) *Attorney, Agent, or Firm* — Toan P. Vo; Denis A. Polyn

(57) ABSTRACT

A substantially fully copolymerized UV blocking hydrogel lens demonstrating sufficient blocking of UV light to meet at least FDA Class II specifications for UV blocking formed from a reaction mixture comprising at least NVP and one other comonomer and a free-radical polymerizable, substituted or unsubstituted, Bis O-hydroxy benzophenone is provided herein.

12 Claims, 1 Drawing Sheet

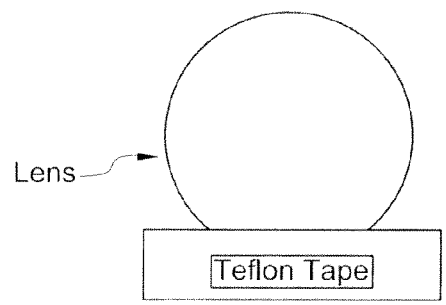
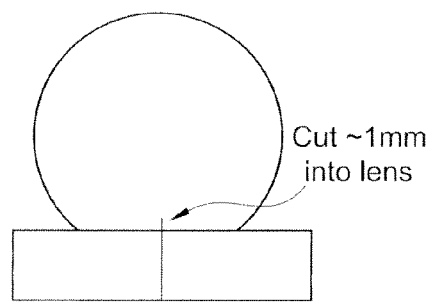
FIG. 1A        FIG. 1B
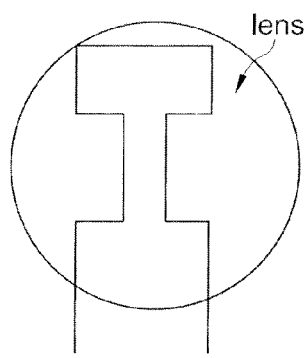
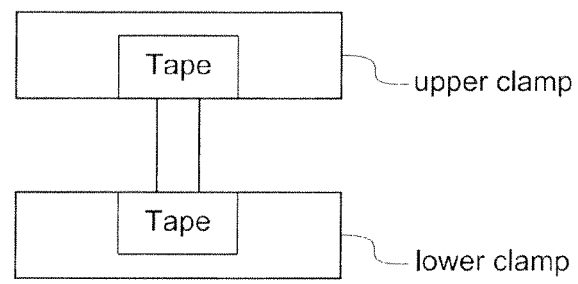
FIG. 2A        FIG. 2B

FULLY POLYMERIZED UV BLOCKING SILICONE HYDROGEL LENS

FIELD

The present invention relates to ophthalmic devices, and more particularly to a method of making a substantially fully polymerized UV blocking hydrogel lens comprising polymerizing a monomer mixture of at least NVP and one other comonomer and a free-radical polymerizable, substituted or unsubstituted, Bis O-hydroxy benzophenone to provide a hydrogel ophthalmic device having a wettable surface and sufficient blocking of UV light to meet at least Class II specifications for UV blocking.

BACKGROUND

Development of a commercially successful ophthalmic device formed from traditional silicone hydrogel materials frequently requires post cure generation of a wettable surface. Traditional silicone hydrogel contact lenses may demonstrate surfacing of silicone chains, i.e., silicone rich domains residing on the surface of a lens. Surfacing of silicone chains can create hydrophobic areas on the lens surface. These surface hydrophobic areas may adversely impact lens wettability. Post cure treatment of the lens surface to enhance wettability is effective but expensive; the additional step(s) add cost and time to the manufacturing process. An alternative to post cure treatment of the surface is incorporation of polyvinylpyrrolidone (PVP) of relatively high molecular weight (for example >300 kDa) into the device by adding it to the monomer mix before curing. The resulting material has entangled non-covalently incorporated PVP which, because of its high molecular weight, will not easily leach out of a hydrated lens. Other methods of providing hydrophilic polymers in the device of a polymerized device are still needed.

Incorporation of substantial amounts of relatively slow reacting hydrophilic monomers such as N-vinylpyrrolidone (NVP) along with faster reacting comonomers in the monomer mix may create a successful ophthalmic device by formation of chains of primarily homo-polyvinylpyrrolidone (PVP) in situ as the device cures. However, monomers typically found in ophthalmic device forming monomer mixes may include relatively slow reacting monomers such as NVP, O-vinyl carbonates, O-vinyl esters (e.g. vinylacetate), O-allyl esters, O-allyl carbonates and N-vinyl carbamates, as well as relatively faster reacting monomers such as acrylates, methacrylates, acrylamides, methacrylamides and styrenics. In device forming systems containing mixtures of fast and slow reacting monomers (such as may be found in monomer mixes for forming silicone hydrogels) a difference in the reaction kinetics of the device forming system (e.g., addition to C=C vs. hydrogen atom transfer) makes such systems particularly susceptible to incomplete cure. Therefore, the relatively sensitive kinetics of the curing reaction in these device forming systems makes creating a successful ophthalmic device difficult.

U.S. Pat. No. 5,135,965 discloses certain monomer mixes containing N-vinylpyrrolidone (NVP) and UV-absorbers capable of being bound to the device after reaction and extraction for intraocular lens applications. The formulations disclosed in U.S. Pat. No. 5,135,965 are not silicone hydrogels.

SUMMARY

Disclosed herein is a method of making a substantially fully polymerized UV blocking hydrogel lens comprising polymerizing a monomer mixture of at least NVP and one other comonomer and a free-radical polymerizable, substituted or unsubstituted, Bis O-hydroxy benzophenone to provide a hydrogel ophthalmic device having a wettable surface and sufficient blocking of UV light to meet at least Class II specifications for UV blocking. FDA Class II blocker rated contact lenses are recommended by the American Optometric Association for general purposes use. These lenses must block more than 70% of UVA and 95% of UVB to be considered to be FDA Class II UV blockers. More preferably a substantially fully polymerized UV blocking silicone hydrogel having large chains of polyvinylpyrrolidone (PVP) formed in situ during cure.

In yet another aspect, the invention includes articles prepared by the method disclosed herein. The method of the invention herein is applicable to preparing a wide variety of polymeric materials, either rigid or soft. Especially preferred polymeric materials are lenses including contact lenses, phakic and aphakic intraocular lenses and corneal implants although all polymeric materials including biomaterials are contemplated as being within the scope of this invention. Preferred articles prepared by the method disclosed herein are optically clear and useful as a contact lens.

BRIEF DESCRIPTION OF THE DRAWINGS

FIG. 1A is a representation of teflon taped Tear specimen as cut from a spherical contact lens; FIG. 1B is a representation of the specimen shown in 1A with the slit cut and ready to be placed in the clamps of an Instron 4502.

FIG. 2A is a representation of the die for cutting the dogbone shaped tensile specimens from the contact lens; FIG. 2B is a representation of mounting the Tear specimen in the clamps of an Instron 4502.

DETAILED DESCRIPTION

Unless clearly stated otherwise all materials used in forming a monomer mix according to the invention herein are listed as weight percent. Also, unless clearly stated otherwise, it will be understood that all amounts of materials used to make the monomers and monomer mixes disclosed herein represent the statistical mean of a normal distribution of weight values as ordinarily encountered in the laboratory or commercial manufacture of the monomers and monomer mixes disclosed herein. Therefore, unless clearly stated otherwise, all numerical values shall be understood as being modified by the term "about".

The expression "substantially fully polymerized" as used herein means the relative monomer inclusion ratio of the cured device reflects the relative monomer ratio of the monomer mix prior to cure. That is, if a monomer present in the monomer mix prior to cure doesn't incorporate fully into the polymerized device, one may see this compositional variation in the extractables. More importantly, the properties of the polymerized device which depend on the presence of a particular monomer(s) present in the monomer mix prior to cure, for example surface wettability and water content, may reflect the absence of the particular monomer(s) from the polymerized device. In the case of the comparative examples containing methacrylamide compounds, the addition of a benzotriazole blocker caused both increased variability in the surface wetting of the lens and a fairly pronounced drop in water content. This indicates the NVP present in the methacrylamide containing monomer mixes of the comparative examples prior to cure was not substantially incorporated into the cured polymerized matrix. Therefore, the methacrylamide and benzotriazole blocker containing comparative examples are not substantially fully polymerized.

Photo Differential Scanning calorimetry (DSC) is another example of an analytical technique which can be used to demonstrate whether a monomer system is "substantially fully polymerized". Other analytical techniques which can be used to demonstrate the monomer system is "substantially fully polymerized" may exist or be developed in the future.

The term "monomer" as used herein refers to varying molecular weight compounds (i.e. typically having number average molecular weights from about 700 to about 100,000) that can be polymerized. In addition, the term "monomer" as used herein refers to medium to high molecular weight compounds, sometimes referred to as macromonomers, (i.e., monomers typically having number average molecular weights greater than 700) containing functional groups capable of further polymerization. Prepolymers are partially polymerized monomers which are capable of further polymerization. Thus, it is understood that the terms "organosilicon-containing monomers", "silicone-containing monomers" and "hydrophilic monomers" include monomers, macromonomers and prepolymers.

An "organosilicon-containing monomer" contains at least one [—Si—O—] or at least one [—Si—(C$_2$-C$_7$ alkyl)-Si—O—] repeating units, in a monomer, macromonomer or prepolymer. Preferably, the total Si and attached O are present in the organosilicon-containing monomer in an amount greater than 5 weight percent, and more preferable greater than 30 weight percent of the total molecular weight of the organosilicon-containing monomer. A "silicone-containing monomer" is one that contains at least one [—Si—O—] repeating units, in a monomer, macromonomer or prepolymer.

Monomers typically found in ophthalmic device forming monomer mixes include slower reacting monomers such as N-vinylpyrrolidone (NVP), O-vinyl carbonates, O-vinyl esters (e.g. vinylacetate), O-allyl esters, O-allyl carbonates and N-vinyl carbamates, as well as faster reacting monomers such as acrylates, methacrylates, acrylamides, methacrylamides and styrenics. In device forming systems containing mixtures of fast and slow reacting monomers (such as may be found in monomer mixes for forming silicone hydrogels) a difference in reaction behavior (e.g., free radical cure vs. hydrogen atom transfer) makes such systems particularly susceptible to incomplete cure. The relative sensitivity of the curing process of these device forming systems makes creating a successful ophthalmic device difficult. Incorporation of substantial amounts of relatively slow reacting hydrophilic monomer such as NVP along with faster reacting comonomers in the monomer mix may create a successful ophthalmic device by formation of chains of primarily homo polyvinylpyrrolidone (PVP) in situ as the device cures.

The use of UV blockers in ophthalmic devices is known. UV light in the 210-315 nm range may cause corneal damage. Thus, ocular devices containing UV absorbers are desirable, in particular for those patients spending considerable time outdoors. Functionalized benzotriazole-type UV absorbers (for example those of Structural Formulae I-IV) have been commonly used as UV blockers for thin articles like contact lenses because of their relatively high extinction coefficient in the UV-region.

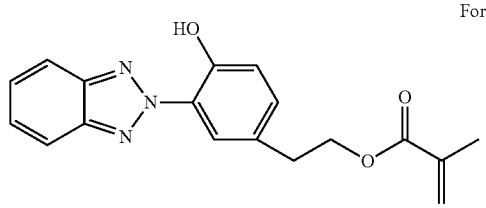

Formula I

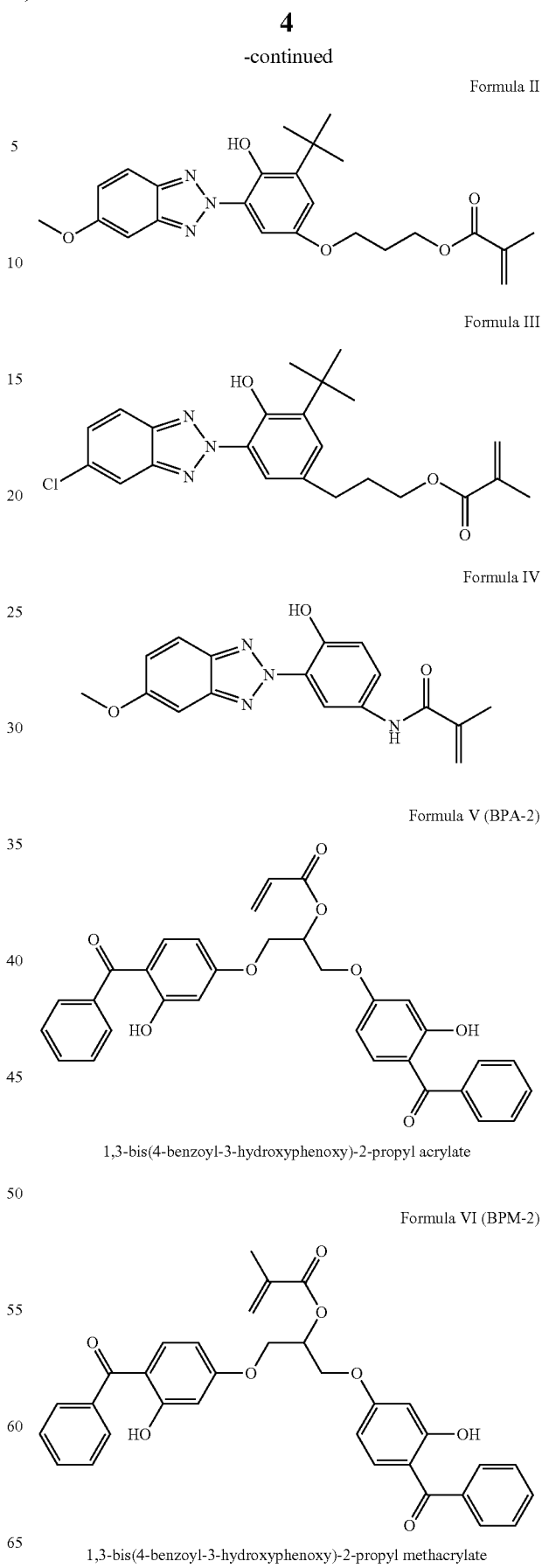

Formula II

Formula III

Formula IV

Formula V (BPA-2)

1,3-bis(4-benzoyl-3-hydroxyphenoxy)-2-propyl acrylate

Formula VI (BPM-2)

1,3-bis(4-benzoyl-3-hydroxyphenoxy)-2-propyl methacrylate

Formula VII (BPA-1)

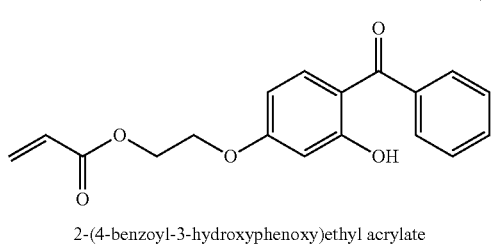

2-(4-benzoyl-3-hydroxyphenoxy)ethyl acrylate

For ophthalmic device forming monomer systems containing both slow reacting monomers such as NVP and fast reacting monomers, the use of benzotriazole UV blockers typically results in incomplete cure of the NVP and a subsequent loss of unreacted or partially oligomerized NVP during extraction. If one is seeking to make silicone hydrogel lenses containing benzotriazole UV blockers as well as PVP formed in the incomplete cure of the NVP can result in lower water content and compromised surface properties (i.e. poorly wettable lenses). Therefore, it was surprising and unexpected to discover that in a method of making a substantially fully polymerized UV blocking hydrogel lens comprising polymerizing a monomer mixture of at least NVP and one other comonomer and a free-radical polymerizable, substituted or unsubstituted, Bis O-hydroxy benzophenone to provide a hydrogel ophthalmic device having a wettable surface and sufficient blocking of UV light to meet at least Class II specifications for UV blocking. FDA Class II blocker rated contact lenses are recommended by the American Optometric Association for general purposes use. These lenses must block more than 70% of UVA and 95% of UVB to be considered to be FDA Class II UV blockers. Preferred compositions for use in the method of the invention herein preferably have both hydrophilic and hydrophobic monomers. Depending upon the specific application, useful articles made according to the method of the invention herein may require organosilicon-containing hydrophobic monomers. These organosilicon-containing hydrophobic monomers can be present at between 0.1 to 75.8 percent by weight, more preferably between 2 to 20 percent by weight, even more preferably between 5 to 13 percent by weight. Amounts of non-organosilicon-containing hydrophobic monomers will be 0 to 60 percent by weight. Examples of non-organosilicon-containing hydrophobic materials include alkyl acrylates and methacrylates.

Depending upon the application, useful articles made according to the invention herein may also require bulky monomers such as those disclosed in U.S. Pat. No. 6,921,802 which include methacryloxypropyl tris(trimethylsiloxy)silane (TRIS), pentamethyldisiloxanyl methylmethacrylate, tris(trimethylsiloxy)methacryloxy propylsilane, phenyltretramethyl-disiloxanylethyl acrylate, methyl-di(trimethylsiloxy)methacryloxymethyl silane, 3-[tris(trimethylsiloxy)silyl]propyl vinyl carbamate, 3[tris(trimethylsiloxy)silyl] propyl allyl carbamate, and 3-[tris(trimethylsiloxy)silyl] propyl vinyl carbonate. These bulky monomers, when present, may be present at greater than 0 to 41.2 percent by weight, 34 to 41 percent by weight or even 25 to 41 percent by weight.

In general, organosilicon-containing hydrogels are prepared by polymerizing a mixture containing at least one silicone-containing monomer and at least one hydrophilic monomer. The organosilicon-containing monomer may function as a crosslinking agent (a crosslinker being defined as a monomer having multiple polymerizable functionalities) or a separate crosslinker may be employed. Hydrophobic crosslinkers would include methacrylates such as ethylene glycol dimethacrylate (EGDMA) and allyl methacrylate (AMA). Amounts of cross-linker used in the method of the invention herein can be between 0 to 76 percent by weight, 2 to 20 percent by weight or 5 to 13 percent by weight.

A wide variety of hydrophilic monomers may be used in the method of the invention herein. Suitable hydrophilic monomers include slow reacting monomers such as vinyl lactams such as NVP and 1-vinylazonan-2-one. Depending upon the application, useful articles may also require, in addition to the slow reacting hydrophilic monomers, fast reacting hydrophilic monomers such as unsaturated carboxylic acids, methacrylic and acrylic acids; acrylic substituted alcohols, such as 2-hydroxyethyl methacrylate and 2-hydroxyethyl acrylate; and acrylamides, such as methacrylamide, N,N-dimethylacrylamide (DMA) and N-isopropylacrylamide (NIPAM).

These hydrophilic monomers will be present, separately or by combined weight in amounts of between 25 to 60 percent by weight, between 30 to 50 percent by weight, between 35 to 45 percent by weight. Preferably the slow reacting hydrophilic monomers will be present in amounts of between 25 to 65 percent by weight, between 30 to 55 percent by weight, between 35 to 45 percent by weight.

The use of significant amounts of slow reacting silicone monomers in the method of the invention herein is cautioned against. Slow reacting silicone monomers would include, for example, vinyl carbonate and vinyl carbamate monomers as disclosed in U.S. Pat. Nos. 5,070,215 and 5,610,252 (Bambury et al).

An organic diluent may be included in the initial monomeric mixture. As used herein, the term "organic diluent" encompasses organic compounds which minimize incompatibility of the components in the initial monomeric mixture and are substantially nonreactive with the components in the initial mixture. Additionally, the organic diluent serves to minimize phase separation of polymerized products produced by polymerization of the monomeric mixture. Also, the organic diluent will generally be relatively non-inflammable.

Contemplated organic diluents include alcohols such as tert-butyl alcohol (TBA), tert-amyl alcohol, hexanol and nonanol; diols, such as ethylene glycol; and polyols, such as glycerol. Preferably, the organic diluent is sufficiently soluble in the extraction solvent to facilitate its removal from a cured article during the extraction step. Other suitable organic diluents would be apparent to a person of ordinary skill in the art.

The organic diluent is included in an amount effective to provide the desired effect (for example, minimal phase separation of polymerized products). Generally, the diluent is included at 0 to 60% by weight of the monomeric mixture, with 1 to 40% by weight being more preferred, 2 to 30% by weight being even more preferred and 3 to 25% by weight being especially preferred.

According to the present process, the monomeric mixture, comprising at least one slow reacting hydrophilic monomer, at least one ethylenically unsaturated hydrophobic monomer and optionally the organic diluent, is shaped and cured by conventional methods such as static casting or spin casting.

The lens formation reaction mechanism can be free radical polymerization using initiators such as azobisisobutyronitrile (AIBN) and peroxide catalysts under conditions such as those set forth in U.S. Pat. No. 3,808,179, incorporated herein by reference. Photoinitiation of polymerization of the monomer mixture as is well known in the art may also be used in the process of forming an article as disclosed herein.

Colorants and the like may be added prior to monomer mix prior to polymerization.

Subsequently, organic diluent is removed from the cured article to improve the biocompatibility of the article. Release of non-polymerized monomers and oligomerized monomers into the eye upon installation of a lens can cause irritation and other problems. Therefore, once the biomaterials formed according to the method disclosed herein have been subjected to the polymerization step they are subsequently subjected to an extraction step to prepare them for packaging and eventual use. The extraction step is accomplished by exposing the polymerized materials to various solvents such as water, 2-propanol, etc. and mixes thereof for varying periods of time. For example, one extraction process is to immerse the polymerized materials in isopropyl alcohol for about an hour, remove the alcohol and then immerse the polymerized materials in an aliquot of water for about thirty minutes, remove that aliquot of water and then autoclave the polymerized material in water or buffer solution.

Following extraction of unreacted monomers and any organic diluent, the shaped article, for example an RGP lens, is optionally machined by various processes known in the art. The machining step includes lathe cutting a lens surface, lathe cutting a lens edge, buffing a lens edge or polishing a lens edge or surface. The present process is particularly advantageous for processes wherein a lens surface is lathe cut, since machining of a lens surface is especially difficult when the surface is tacky or rubbery.

Generally, such machining processes are performed before the article is released from a mold part. After the machining operation, the lens can be released from the mold part and hydrated. Alternately, the article can be machined after removal from the mold part and then hydrated.

The following examples are provided to enable one skilled in the art to practice the invention and are merely illustrative of the invention. The examples should not be read as limiting the scope of the invention as defined in the claims.

EXAMPLES

All solvents and reagents were obtained from commercially available sources as identified below and used as received.

| Material | Vendor |
| --- | --- |
| TRIS | Silar Laboratories |
| Ma2D37 | Gelest |
| NVP - Distilled | Aldrich |
| CIX-4 | Novasep |
| DMA - Distilled | Aldrich |
| Irg 819 | Aldrich |
| Hexanol | Sigma Aldrich |
| Nonanol | Aldrich |
| SA Monomer | Aldrich |
| BTT | Aldrich |
| BPA-2 | Polysciences Inc |
| BPM-2 | Monomer-Polymer and Dajac Labs |
| BPA-1 | Aldrich |
| Reactive Blue Tint = IMVT | Arran |
| M1-EDS-6 | Gelest |
| HEMA | Cyro Industries |

-continued

| Material | Vendor |
| --- | --- |
| BTT | |

2-(2H-benzotriazol-2-yl)-4-(1,1,3,3-tetrabutyl) phenol

CIX-4 diethyleneglycol bis(N-vinyl carbamate)

Analytical Measurements

Mechanical Properties

Modulus and elongation tests were conducted according to ASTM D-1708a, employing an Instron (Model 4502) instrument where the hydrogel film sample is immersed in BBS (isotonic physiologic Borate Buffered Saline, pH 6.8-7.2, Osmolality 270-320); an appropriate size of the film sample is gauge length 22 mm and width 4.75 mm, where the sample further has ends forming a dog bone shape as shown in FIG. 2A to accommodate gripping of the sample with clamps of the Instron instrument, and a thickness of 200±50 microns.

Method for Determining the Tear Strength of Spherical Hydrogel Contact Lenses

Preparation of Samples

1. Remove the first lens from the packaging and place it anterior side down on the cutting block.
2. Gently wipe any excess fluid off the surface at one edge.
3. Tape the front and back sides of that edge with Teflon tape as represented in FIG. 1A and cut the tape down to a rectangle.
4. Once taped, place the specimen in a Petri dish filled with BBS to rehydrate.

Test Procedure

1. Lower the saline tank on the Instron 4502 equipped with same.
2. Take the specimen out of the saline and cut through the tape approximately 1 mm into the lens beyond the tape to initiate the tear as represented in FIG. 1B.
3. Mount one side into the upper clamp and the other side into the lower clamp as represented in FIG. 2B so that the initiated tear is held in tension.
4. Raise the saline tank around the specimen.
5. Allow the specimen to hydrate for at least 30 seconds before starting the test.

NOTE: Once the specimen is mounted make sure that the load does not read more than 0.1 g. If it is greater than 0.1 g, remove the specimen and rebalance the load until 0.000 g±0.002 is reached. Then replace the specimen in the grips and raise the tank.

6. Using the software control, enter in the specimen thickness and begin the test.
7. Once the first specimen has completed the tear, review the load displacement plot and data to determine if the data should be kept (filed) or rejected. Any gross failures, such as discontinuities in the plot should be rejected. If the first displacement marker is to the left of the first peak in load, then move it to the first peak in load. Repeat for the remaining specimens for the sample batch.
8. Once all the specimens from one lot are tested print a copy of the results.

Data Recording

Report the average tear strength and the standard deviation. Note on the request and raw data sheet that the data was calculated using the average thickness at a 6 mm diameter (or at center thickness if the anterior and posterior radii could not be obtained).

Required Materials and Equipment

Description—This testing procedure describes the materials and procedure used to determine the modulus of spherical hydrogel contact lenses.

1. An Instron model 4502 mechanical tester coupled with a 250 g load cell installed on the stationary crosshead.
2. A saline tank fixed to the Instron to keep the specimen hydrated during testing.
3. Test Works data acquisition package and data station (computer and printer).
4. A set of 10 lenses (at minimum) for testing.
5. A pair of Teflon tweezers for handling the contact lenses.
6. A wood cutting block.
7. A hammer.
8. A die to cut the tensile specimens from the contact lens. Must cut specimens to the dimensions shown in FIG. 2A.
9. Teflon Tape.
10. A pair of scissors.
11. A Petri dish filled with BBS.

Instrument Setup

1. Using the anterior and posterior radii given for the lot tested, convert the center thickness submitted to the average thickness at a 6 mm diameter. Use the average thickness for the lens dimensions.
2. Set the Instron grips to be separated to accommodate a 6 mm gauge length sample.
3. Raise the saline tank around the grips so that the grips can equilibrate for 10 to 15 minutes prior to use.
4. Calibrate the instrument so that the load display reads 0.000±0.002 g. NOTE: Use a 6.35 mm/min crosshead speed.
5. Select method number 10 so that the modulus is calculated between loads of 0.25 g and 2 g.

Preparation of Samples

1. Remove the first lens from the packaging and place it anterior side down on the cutting block.
2. Cut a tensile specimen by centering a die designed to prepare a shape as shown in FIG. 2A on the posterior surface of the lens and hammering the back side of the die once.
3. Remove the tensile specimen from the die and tape the front and back side of each edge as represented in FIG. 2B.
4. Cut the tape down to a rectangle.
5. Once taped, place the specimen in a Petri dish filled with BBS to rehydrate.

Test Procedure

1. Lower the saline tank on the Instron 4502.
2. Take the specimen out of the saline and mount one edge into the upper clamp and the other into the lower clamp as shown in FIG. 2B so that the specimen is taut and straight.
3. Raise the saline tank around the specimen.
4. Allow the specimen to hydrate for at least 30 seconds before starting the test.
NOTE: Once the specimen is mounted make sure that the load does not read more than 0.100 g. If it is greater than 0.100 g, remove the specimen and rebalance the load until 0.000 g±0.002 is reached. Then replace the specimen in the grips and raise the tank.
5. Using the software control, enter the specimen thickness and begin the test.
6. Once the first specimen has broken, review the load displacement plot and data to determine if the data should be kept (filed) or rejected. Any gross failures, such as discontinuities in the plot should be rejected. Enlarge the modulus slope region to determine if the tangent was drawn correctly. Repeat for the remaining specimens for the sample lot.
7. Once all the specimens from one lot are tested print a copy of the results.

Data Recording

Report the average modulus and the standard deviation. Note on the request and raw data sheet that the data was calculated using the average thickness at a 6 mm diameter (or at center thickness if the anterior and posterior radii could not be obtained).

Contact Angle Measurements Performed by Captive Bubble

Captive Bubble testing is performed using the First Ten Angstroms (Model FTA Series 1000); equipped with a 50 mm USB high speed camera with image capture capability. Ensure that Interfacial Tension of water test has been performed and has met acceptable criteria prior to performing Captive Bubble testing.

Lenses in BBS Packaging Solution Protocol

Prepare lenses in lots of three each which are transferred with tweezers from individual packaging into Petri dishes filled to mark with 18 Meg water. Latex gloves are to be worn during the duration of sample preparation and Captive Bubble testing. Note: BBS samples are to soak for a minimum of 15 minutes prior to testing.

Analysis of First Lens Sample

After the lens samples pretreatment use tweezers to mount one lens sample on the lens nickel mounting tool, then position the tool into the tool holding fixture. Position the fixture into a glass cuvette filled to mark with 18 Meg water. Position the fixture onto the FTA 1000 stage. In MENU select Z Stage±, move by +21.00 polarity (moves bottom stage/lens/fixture into proper position). In Menu select Tip Z±, move by −18.00 polarity (moves needle tip into proper position). Menu: select DISPENSE. If the bubble is not observed at this time, manually PUMP OUT until the bubble first appears. Press START. The bubble will begin to increase in size until it is only a short distance from the lens surface, then automatically stop (Note if it appears that the bubble is going to touch the lens surface immediately press STOP. Enter 0.03 in the polarity value box, then press move by − until the bubble almost comes in contact with the lens surface. Select Y stage Z±, move by ±, 0.250 to set the white reflection lines to the point of bubble attachment. Enter 0.03 in the polarity value box again, then press move by − until the bubble first comes in contact with the lens surface. Wait a second or two to see if the point of contact appears to spread horizontally. If not, press move by − once again. Press RUN (starts movie event), wait for an audible beep sound, press PUMP OUT, wait 1 to 2 seconds, then press PUMP IN.

At the moment the bubble detaches from the lens surface press ABORT (Pressing ABORT ends the movie event). Save the movie as a file in a folder in a E\: FTA in the Captive Bubble folder, i.e. New Folder: 11-XXX. Create a movie file: 01-1,2,3 for each lens from the same lot. Press PUMP IN to shrink the size of the bubble to its original size at dispense. Menu: Tip Z±, move by +0.03 3 to 5 times then enter +18.00 to raise the needle tip up to its proper height for the next sample. Menu: Z Stage ±, move by −21.00 to lower bottom stage/lens/fixture into proper position for the next sample. Remove the fixture/Lens sample/cuvette from the stage. Remove the fixture from the cuvette. Remove the lens holder from the fixture and discard. Using tweezers, obtain the next lens sample to be tested. Use fresh 18 Meg water to rinse and fill the cuvette between each lot. End of the day: deselect VIDEO to turn off. Rinse the cuvette, lens holder, allow to air dry and store under foil. Use Y Stage ± move by − or +0.250 to adjust the stage white lines used for alignment with the bubble contacting the lens surface. Use X Stage ± move by − or +0.10 or other value to adjust both sides of the stage at approximately the same height.

Wilhelmy Plate Wettability Measurement—Determination of Hysteresis Loop Area

Wilhelmy plate hysteresis loop measurements were all carried out in a Kruss Processor Tensiometer Model K100MK2.

Procedure

Sample lenses to be tested were rinsed in BBS overnight to remove any remnants of packaging solution components. Once rinsed, samples were removed from the solution and placed in fresh BBS for at least 15 minutes. The Pt anchor used to weigh down samples) was flamed with a propane torch to remove all surface contamination. All lenses were cut into strips using a sharp blade to the following dimension: 10 mm long×3.3 mm wide. Attach Pt anchor to the sample strip within 1 mm of the bottom. Attach the top half of the lens strip to the sample clip in the instrument, and place into the electrobalance holder. Fill dip tank with fresh BBS. Lower cut lens sample and anchor into the fresh BBS such that the bottom of the lens is approximately 1 mm above the BBS solution. Set the dipping speed to run and 6 mm/min and the total distance traveled to 9.5 mm. Discard the results from the first dipping cycle as the lens is re-hydrating after sample preparation. Perform three additional dipping cycles. Plot the force exerted on the sample as a function of distance traveled for the three cycles and average the results. Integrate the area bound by the curve for the average force plot and report this value as the hysteresis loop area.

TABLE 1

Comparative Examples

| | | TRIS | Ma2D37 | NVP | CIX-4 | DMA | Irg 819 | Hexanol | Nonanol | SA Monomer |
|---|---|---|---|---|---|---|---|---|---|---|
| Comparative Example 1 | wt % | 34.1 | 7.48 | 36.3 | 0.25 | 4.98 | 0.33 | 16.6 | * | 0 |
| Comparative Example 2 | wt % | 33.9 | 7.44 | 36.1 | 0.25 | 4.96 | 0.33 | 16.5 | * | 0.41 |
| Comparative Example 3 | wt % | 33.8 | 7.41 | 36 | 0.25 | 4.94 | 0.33 | 16.5 | * | 0.82 |
| Comparative Example 4 | wt % | 33.6 | 7.38 | 35.8 | 0.25 | 4.92 | 0.33 | 16.4 | * | 1.23 |
| Comparative Example 5 | wt % | 33.5 | 7.35 | 35.7 | 0.25 | 4.9 | 0.33 | 16.3 | * | 1.63 |
| Comparative Example 6 | wt % | 33.7 | 7.43 | 35.9 | 0.248 | 4.99 | 0.337 | 17.3 | * | * |
| Comparative Example 7 | wt % | 33.5 | 7.37 | 35.6 | 0.246 | 4.95 | 0.334 | 17.2 | * | 0.852 |
| Comparative Example 8 | wt % | 33.5 | 7.37 | 35.6 | 0.246 | 4.95 | 0.334 | 17.2 | * | * |
| Comparative Example 9 | wt % | 34.8 | 7.05 | 30.8 | * | 4.74 | 0.47 | * | 4.74 | * |
| Comparative Example 10 | wt % | 34.6 | 7.02 | 30.7 | * | 4.72 | 0.468 | * | 4.72 | 0.7 |
| Comparative Example 11 | wt % | 34.7 | 7.02 | 30.9 | * | 4.74 | 0.471 | * | 4.71 | * |
| Comparative Example 12 | wt % | 34.5 | 6.98 | 30.5 | * | 4.7 | 0.466 | * | 4.7 | * |
| Comparative Example 13 | wt % | 34.2 | 6.92 | 30.2 | * | 4.65 | 0.461 | * | 4.65 | * |

| | 2-(2H-Benzotriazol-2-yl)-4-(1,1,3,3-tetramethyl butyl) phenol (BTT) | BPA-2 | BPM-2 | BPA-1 | Reactive Blue Tint | M1-EDS-6 | HEMA |
|---|---|---|---|---|---|---|---|
| Comparative Example 1 | * | * | * | * | * | * | * |
| Comparative Example 2 | * | * | * | * | * | * | * |
| Comparative Example 3 | * | * | * | * | * | * | * |
| Comparative Example 4 | * | * | * | * | * | * | * |
| Comparative Example 5 | * | * | * | * | * | * | * |
| Comparative Example 6 | * | * | * | * | 0.023 | * | * |
| Comparative Example 7 | * | * | * | * | 0.023 | * | * |
| Comparative Example 8 | 0.806 | * | * | * | 0.023 | * | * |
| Comparative Example 9 | * | * | * | * | 0.02 | 12.7 | 4.74 |
| Comparative Example 10 | * | * | * | * | 0.02 | 12.6 | 4.72 |

TABLE 1-continued

| | Comparative Examples | | | | | | | |
|---|---|---|---|---|---|---|---|---|
| Comparative Example 11 | * | * | * | * | | 0.02 | 12.6 | 4.87 |
| Comparative Example 12 | * | * | * | | 0.933 | 0.02 | 12.5 | 4.7 |
| Comparative Example 13 | * | * | * | | 1.84 | 0.02 | 12.4 | 4.65 |

[* Material not included in Comparative Example/Example]

TABLE 2

| | | | | | | | | | | SA | | | | | Reactive | M1- | |
|---|---|---|---|---|---|---|---|---|---|---|---|---|---|---|---|---|---|
| | Measurement Type | TRIS | Ma2D37 | NVP | CIX-4 | DMA | Irg 819 | Hexanol | Nonanol | SA Monomer | BTT | BPA-2 | BPM-2 | BPA-1 | Reactive Blue Tint | M1-EDS-6 | HEMA |
| Example 1 | wt % | 34.6 | 7.02 | 30.7 | * | 4.72 | 0.468 | * | 4.72 | * | * | 0.47 | * | * | 0.02 | 12.6 | 4.72 |
| Example 2 | wt % | 34.5 | 6.98 | 30.51 | * | 4.695 | 0.466 | * | 4.695 | * | * | 0.94 | * | * | 0.02 | 12.541 | 4.695 |
| Example 3 | wt % | 34.3 | 6.95 | 30.4 | * | 4.67 | 0.463 | * | 4.67 | * | * | 1.4 | * | * | 0.02 | 12.5 | 4.67 |
| Example 4 | wt % | 34.1 | 6.92 | 30.2 | * | 4.65 | 0.461 | * | 4.65 | * | * | 1.87 | * | * | 0.02 | 12.4 | 4.65 |
| Example 5 | wt % | 34.4 | 6.96 | 30.6 | * | 4.7 | 0.466 | * | 4.67 | * | * | * | 0.939 | * | 0.02 | 12.5 | 4.83 |
| Example 6 | wt % | 34.5 | 6.98 | 30.5 | * | 4.7 | 0.466 | * | 4.7 | * | * | * | 1.864 | * | 0.02 | 12.5 | 4.7 |
| Example 7 | wt % | 34.5 | 6.98 | 30.5 | * | 4.7 | 0.466 | * | 4.7 | * | * | 0.94 | * | * | 0.02 | 12.5 | 4.7 |
| Example 8 | wt % | 34.9 | 7.05 | 30.8 | * | 4.7 | 0.47 | * | 4.7 | * | * | * | * | * | 0.02 | 12.66 | 4.74 |
| Example 9 | wt % | 34.1 | 6.92 | 30.2 | * | 4.7 | 0.46 | * | 4.7 | * | * | 1.86 | * | * | 0.02 | 12.42 | 4.65 |
| Example 10 | wt % | 34.4 | 7.00 | 30.4 | * | 4.9 | 0.47 | * | 4.6 | * | * | * | 0.93 | * | 0.02 | 12.51 | 4.81 |

[* Material not included in Comparative Example/Example]

TABLE 3

| Sample ID | Blocker | Blocker parts Wt % | Modulus | Tensile | % Elongation | Tear | UV Class | % cure | % WC | WP Area Loop | Contact Angle Rec | Contact Angle Adv | Contact Angle Hyst |
|---|---|---|---|---|---|---|---|---|---|---|---|---|---|
| Comparative Example 9 | None | 0 | 74 (3) | 65 (33) | 150 (76) | 5 | None | 100 | 45.1 | 1.44 | 20 (0.3) | 32 (3.2) | 13 (3.3) |
| Comparative Example 10 | SA monomer | 0.7 | 90 (7) | 57 (33) | 111 (75) | 6 | II | 100 | 43.1 | 2.11 | 20 (0.3) | 33 (1.4) | 13 (1.4) |
| Comparative Example 12 | BPA-1 | 1 | 64 (5) | 38 (25) | 97 (68) | 5 | II | 100 | 47.8 | 1.56 | 21 (1.0) | 61 (27.5) | 40 (28.4) |
| Comparative Example 13 | BPA-1 | 2 | 37 (6) | 38 (23) | 170 (100) | 6 | II | 99.3 | 44.1 | 2.01 | 21 (1.2) | 108 (5.2) | 87 (4.9) |
| Example 7 | BPA-2 | 1 | 75 (6) | 89 (21) | 205 (43) | 6 | II | 100 | 43.9 | 1.83 | 21 (0.6) | 31 (1.0) | 11 (1.2) |
| Example 4 | BPA-2 | 2 | 76 (5) | 77 (29) | 169 (56) | 6 | II | 100 | 45.1 | 1.43 | 21 (1.3) | 33 (3.3) | 12 (4.6) |
| Example 8 | None | 0 | 63 (5) | 57 (12) | 155 (34) | | None | | 44.9 | 0.67 | 20 (0.8) | 32 (0.7) | 12 (0.4) |
| Example 9 | BPA-2 | 2 | 70 (3) | 75 (22) | 191 (55) | | II | | 44.2 | 0.91 | 21 (0.9) | 33 (0.5) | 11 (1.3) |
| Example 10 | BPM-2 | 1 | 86 (5) | 93 (13) | 198 (32) | | II | | 42.3 | 0.96 | 21 (0.4) | 29 (1.9) | 9 (2.1) |

TABLE 4

| | Example 11 | Example 12 | Example 13 | Example 14 |
|---|---|---|---|---|
| Formulation | | | | |
| TRIS | 33.00 | 33.15 | 33.50 | 33.64 |
| Ma2D37 | 5.75 | 5.78 | 3.63 | 3.65 |
| Ma1D20 | 1.64 | 1.65 | 3.68 | 3.70 |
| NVP | 35.95 | 36.11 | 35.68 | 35.84 |
| CIX-4 | 0.25 | 0.25 | 0.25 | 0.25 |
| DMA | 4.95 | 4.98 | 4.92 | 4.94 |
| Irg 819 | 0.33 | 0.33 | 0.33 | 0.33 |
| Hexanol | 16.48 | 16.55 | 16.35 | 16.42 |
| Tint | 0.02 | 0.02 | 0.02 | 0.02 |
| BPA-2 | 1.64 | | 1.65 | |
| BPM2 | | 1.21 | | 1.23 |

TABLE 4-continued

|  | Example 11 | Example 12 | Example 13 | Example 14 |
|---|---|---|---|---|
| Properties |  |  |  |  |
| Modulus (g/mm2) | 103 (8) | 110 (6) | 81 (4) | 72 (5) |
| Tensile Strength (g/mm2) | 160 (11) | 132 (32) | 98 (46) | 66 (16) |
| % Elongation (%) | 220 (8) | 179 (31) | 189 (72) | 141 (35) |
| Tear Strength (g/mm) | 8 (1) | 8 (1) | 8 (1) | 8 (0.2) |
| Water Content (%) | 55.1 (0.1) | 55.1 (0.1) | 58.9 (0.1) | 59.1 (0.1) |
| Contact Angle Adv. | 37 (0.3) | 37 (0.4) | 37 (0.8) | 37 (0.4) |
| UVB Class | II | II | II | II |

TABLE 5

|  | Contact Angle | | | |
|---|---|---|---|---|
| Sample ID | Rec | Adv | Hyst | % WC |
| Comparative Example 1 | 21 (0.3) | 30 (0.2) | 9 (0.4) | 51.5 (0.4) |
| Comparative Example 2 | 21 (0.4) | 30 (1.0) | 9 (1.0) | 51.0 (0.5) |
| Comparative Example 3 | 20 (0.7) | 31 (0.9) | 10 (1.5) | 47.6 (0.4) |
| Comparative Example 4 | 21 (0.8) | 81 (2.3) | 60 (1.7) | 40.3 (0.7) |
| Comparative Example 5 | 21 (0.8) | 84 (2.3) | 63 (2.1) | 37.0 (0.3) |

TABLE 6

| Notebook # | Blocker | Blocker (%) | Mod. | Tear | WC (%) | WP Area Loop | UV Class | Contact Angle Rec. | Adv. | Hyst. |
|---|---|---|---|---|---|---|---|---|---|---|
| Comparative Example 9 | None | 0 | 74 | 5 | 45.1 | 1.44 | None | 20 (0.3) | 32 (3.2) | 13 (3.3) |
| Comparative Example 10 | SA Monomer | 0.7 | 90 | 6 | 43.1 | 2.11 | II | 20 (0.3) | 33 (1.4) | 13 (1.4) |
| Example 4 | BPA-2 | 2.0 | 76 | 6 | 45.1 | 1.43 | II | 21 (1.3) | 33 (3.3) | 12 (4.6) |

Results

As shown by the water content data in Tables 3 and 5, the use of benzotriazole blockers (SA monomer) in monomer systems results in incomplete cure of NVP with subsequent loss of unreacted or partially oligomerized NVP during extractions. Additionally, in the presence of SA monomer many lenses in a given lot will exhibit very large advancing contact angles and increased variability of the contact angle. This variability is not observed when the SA monomer UV blocker is removed from the formulation.

Preferred Embodiments

1. A method of making a substantially fully polymerized UV blocking hydrogel lens comprising:
   polymerizing a monomer mixture of at least NVP and one other comonomer and a free-radical polymerizable, substituted or unsubstituted, Bis O-hydroxy benzophenone to provide a hydrogel ophthalmic device having a wettable surface and sufficient blocking of UV light to meet at least Class II specifications for UV blocking.

2. The method of embodiment 1 further comprising:
   reacting the monomer mixture under conditions suitable to cause substantially fully co-cure of the monomer system component of the reaction mixture to provide a UV blocker containing substantially fully copolymerized ophthalmic device.

3. The method of embodiment 1, wherein the Bis O-hydroxy substituted benzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

4. The method of embodiment 2, wherein the substantially fully copolymerized UV blocker containing ophthalmic device has a water content of about 42.3% to about 59.1% when fully hydrated.

5. The method of embodiment 2, wherein the substantially fully copolymerized UV blocker containing ophthalmic device has a receding contact angle of about 21.

6. The method of embodiment 2, wherein the substantially fully copolymerized UV blocker containing ophthalmic device has an advancing contact angle of between about 29 and about 33.

7. A UV blocking contact lens containing entrained PVP and having a water content of about 42.3% to about 59.1% when fully hydrated.

8. The UV blocking contact lens of embodiment 7 having a receding contact angle of about 21.

9. The UV blocking contact lens of embodiment 7 having a advancing contact angle of between about 29 and about 33.

10. A UV blocking silicone hydrogel contact lens containing entrained PVP and having a having a water content of about 42.3% to about 59.1% when fully hydrated.

11. The UV blocking silicone hydrogel contact lens of embodiment 10 and having a receding contact angle of about 21.

12. The UV blocking silicone hydrogel contact lens of embodiment 10 and having a advancing contact angle of between about 29 and about 33.

13. The method of embodiment 1 wherein the free-radical polymerizable, substituted or unsubstituted, Bis O-hydroxy benzophenone is functionalized with the free-radical polymerizable mono acrylate or mono methacrylate group.

14. The method of embodiment 1, wherein the substantially fully copolymerized UV blocker containing ophthalmic device has a Wilhelmy Plate area loop of between 0.91 and 1.83.

15. The method of embodiment 1, wherein the monomer mixture further comprises an organosilicon-containing hydrophobic monomer.

16. The method of embodiment 15 wherein the organosilicon-containing monomer is present at between 0.1 to 75.8 percent by weight.

17. The method of embodiment 15 wherein the organosilicon-containing monomer is present at between 2 to 20 percent by weight.

18. The method of embodiment 15 wherein the organosilicon-containing monomer is present at between 5 to 13 percent by weight.

19. The method of embodiment 15 wherein the monomer mixture further comprises non-organosilicon-containing hydrophobic monomers.

20. The method of embodiment 19 wherein the non-organosilicon-containing hydrophobic monomers are present at about 0 to 60 percent by weight.

21. The method of embodiment 19 wherein the non-organosilicon-containing hydrophobic monomers are selected from the group consisting of alkyl acrylates and alkyl methacrylates.

22. The method of embodiment 15 wherein the monomer mixture further comprises a bulky monomer selected from the group consisting of methacryloxypropyl tris(trimethylsiloxy) silane (TRIS), pentamethyldisiloxanyl methylmethacrylate, tris(trimethylsiloxy)methacryloxy propylsilane, phenyltretramethyl-disiloxanylethyl acrylate, methyl-di(trimethylsiloxy)methacryloxymethyl silane, 3-[tris(trimethylsiloxy)silyl]propyl vinyl carbamate, 3[tris(trimethylsiloxy)silyl] propyl allyl carbamate, and 3-[tris(trimethylsiloxy)silyl] propyl vinyl carbonate, and mixtures thereof.

23. The method of embodiment 22 wherein the bulky monomer is present at greater than 0 to 41.2 percent by weight.

24. The method of embodiment 22 wherein the bulky monomer is present at greater than 34 to 41 percent by weight.

25. The method of embodiment 22 wherein the bulky monomer is present at greater than 25 to 41 percent by weight.

26. The method of embodiment 15 wherein the monomer mixture further comprises a hydrophobic crosslinkers selected from the group consisting of ethylene glycol dimethacrylate (EGDMA), allyl methacrylate (AMA) and mixtures thereof.

27. The method of embodiment 26 wherein the hydrophobic crosslinkers is present at between 0 to 76 percent by weight.

28. The method of embodiment 26 wherein the hydrophobic crosslinkers is present at between 2 to 20 percent by weight.

29. The method of embodiment 26 wherein the hydrophobic crosslinkers is present at between 5 to 13 percent by weight.

30. The method of embodiment 15 wherein the monomer mixture further comprises a slow reacting hydrophilic monomer in addition to NVP.

31. The method of embodiment 30 wherein the slow reacting hydrophilic monomer is 1-vinylazonan-2-one.

32. The method of embodiment 15 wherein the monomer mixture further comprises a fast reacting hydrophilic monomer.

33. The method of embodiment 32 wherein the fast reacting hydrophilic monomer is selected from the group consisting of unsaturated carboxylic acids, acrylic substituted alcohols, acrylamides and mixtures thereof.

34. The method of embodiment 32 wherein the fast reacting hydrophilic monomer is selected from the group consisting of methacrylic acid, acrylic acid, 2-hydroxyethyl methacrylate, 2-hydroxyethyl acrylate, methacrylamide, N,N-dimethylacrylamide (DMA), N-isopropylacrylamide (NIPAM) and mixtures thereof.

35. The method of embodiment 32 wherein the fast reacting hydrophilic monomer is present at between 25 to 60 percent by weight.

36. The method of embodiment 32 wherein the fast reacting hydrophilic monomer is present at between 30 to 50 percent by weight.

37. The method of embodiment 32 wherein the fast reacting hydrophilic monomer is present at between 35 to 45 percent by weight.

38. The method of embodiment 30 wherein the slow reacting hydrophilic monomer is present at between 25 to 65 percent by weight.

39. The method of embodiment 30 wherein the slow reacting hydrophilic monomer is present at between 30 to 55 percent by weight.

40. The method of embodiment 30 wherein the slow reacting hydrophilic monomer is present at between 35 to 45 percent by weight.

41. The method of embodiment 1 wherein the monomeric mixture further comprises at least one slow reacting hydrophilic monomer, at least one ethylenically unsaturated hydrophobic monomer and an organic diluent and comprising the combined step of shaping and polymerizing by a method selected from the group consisting of static casting and spin casting.

42. The method of embodiment 41 further comprising the step of exposing the polymerized materials to a solvent selected from the group consisting of water, 2-propanol, etc. and mixes thereof.

43. The method of embodiment 42 further comprising the step of autoclaving the polymerized material in water or buffer solution.

44. The UV blocking contact lens of embodiment 7 having a Wilhelmy Plate area loop of between 0.91 and 1.83.

45. The UV blocking silicone hydrogel contact lens of embodiment 10 having a Wilhelmy Plate area loop of between 0.91 and 1.83.

46. The method of embodiment 1 as modified by any one of embodiments 2-6 or 13-43.

47. The method of embodiment 1 as modified by any combination of embodiments 2-6 or 13-43.

48. The contact lens of embodiment 7 as modified by combination of embodiments 8, 9 and 44.

49. The contact lens of embodiment 10 as modified by on combination of embodiments 11, 12 and 45.

50. A method of making a substantially fully polymerized UV blocking hydrogel lens comprising:
polymerizing a monomer reaction mixture of at least NVP and one other comonomer and a free-radical polymerizable, substituted or unsubstituted, Bis O-hydroxy benzophenone to provide a substantially fully polymerized hydrogel ophthalmic device.

51. The method of embodiment 50 wherein the substantially fully polymerized hydrogel ophthalmic device has a wettable surface.

52. The method of embodiment 50 or 51 wherein the hydrogel ophthalmic device demonstrates sufficient blocking of UV light to meet at least FDA Class II specifications for UV blocking.

53. The method of embodiment 50 further wherein the step of polymerizing produces substantially full co-curing of a monomer system component of the monomer reaction mixture to provide a substantially fully copolymerized ophthalmic device.

54. The method of embodiment 50, wherein the free-radical polymerizable, substituted or unsubstituted, Bis O-hydroxy substituted benzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

55. The method of embodiments 50 or 53, wherein the substantially fully copolymerized ophthalmic device has a water content of about 42.3% to about 59.1% when fully hydrated.

56. The method of embodiments 50 or 53, wherein the substantially fully copolymerized ophthalmic device has a receding contact angle of about 21.

57. The method of embodiments 50 or 53, wherein the substantially fully copolymerized ophthalmic device has an advancing contact angle of between about 29 and about 33.

58. A UV blocking contact lens demonstrating sufficient blocking of UV light to meet at least FDA Class II specifications for UV blocking containing entrained PVP and having a water content of about 42.3% to about 59.1% when fully hydrated.

59. The UV blocking contact lens of embodiment 58 having a receding contact angle of about 21.

60. The UV blocking contact lens of embodiment 58 having a advancing contact angle of between about 29 and about 33.

61. A UV blocking silicone hydrogel contact lens demonstrating sufficient blocking of UV light to meet at least FDA Class II specifications for UV blocking containing entrained PVP and having a having a water content of about 42.3% to about 59.1% when fully hydrated.

62. The UV blocking silicone hydrogel contact lens of embodiment 61 and having a receding contact angle of about 21.

63. The UV blocking silicone hydrogel contact lens of embodiment 61 and having a advancing contact angle of between about 29 and about 33.

64. The method of embodiment 50 wherein the free-radical polymerizable, substituted or unsubstituted, Bis O-hydroxy benzophenone is functionalized with a free-radical polymerizable mono acrylate or mono methacrylate group.

65. The method of embodiment 50, wherein the substantially fully copolymerized UV blocker containing ophthalmic device has a Wilhelmy Plate area loop of between 0.91 and 1.83.

66. The method of embodiment 50, wherein the monomer mixture further comprises a organosilicon-containing hydrophobic monomer.

67. The method of embodiment 64 wherein the organosilicon-containing monomer is present at between 0.1 to 75.8 percent by weight.

68. The method of embodiment 64 wherein the organosilicon-containing monomer is present at between 2 to 20 percent by weight.

69. The method of embodiment 64 wherein the organosilicon-containing monomer is present at between 5 to 13 percent by weight.

70. The method of embodiment 65 wherein the monomer mixture further comprises non-organosilicon-containing hydrophobic monomers.

71. The method of embodiment 70 wherein the non-organosilicon-containing hydrophobic monomers are present at about 0 to 60 percent by weight.

72. The method of embodiment 70 wherein the non-organosilicon-containing hydrophobic monomers are selected from the group consisting of alkyl acrylates and alkyl methacrylates.

73. The method of embodiment 64 wherein the monomer mixture further comprises a bulky monomer selected from the group consisting of methacryloxypropyl tris(trimethylsiloxy) silane (TRIS), pentamethyldisiloxanyl methylmethacrylate, tris(trimethylsiloxy)methacryloxy propylsilane, phenyltretramethyl-disiloxanylethyl acrylate, methyl-di(trimethylsiloxy)methacryloxymethyl silane, 3-[tris(trimethylsiloxy)silyl]propyl vinyl carbamate, 3[tris(trimethylsiloxy)silyl] propyl allyl carbamate, and 3-[tris(trimethylsiloxy)silyl] propyl vinyl carbonate, and mixtures thereof.

74. The method of embodiment 73 wherein the bulky monomer is present at greater than 0 to 41.2 percent by weight.

75. The method of embodiment 73 wherein the bulky monomer is present at greater than 34 to 41 percent by weight.

76. The method of embodiment 73 wherein the bulky monomer is present at greater than 25 to 41 percent by weight.

77. The method of embodiment 64 wherein the monomer mixture further comprises a hydrophobic crosslinkers selected from the group consisting of ethylene glycol dimethacrylate (EGDMA), allyl methacrylate (AMA) and mixtures thereof.

80. The method of embodiment 77 wherein the hydrophobic crosslinkers is present at between 0 to 76 percent by weight.

81. The method of embodiment 77 wherein the hydrophobic crosslinkers is present at between 2 to 20 percent by weight.

82. The method of embodiment 77 wherein the hydrophobic crosslinkers is present at between 5 to 13 percent by weight.

83. The method of embodiment 64 wherein the monomer mixture further comprises a slow reacting hydrophilic monomer in addition to NVP.

84. The method of embodiment 32 wherein the slow reacting hydrophilic monomer is 1-vinylazonan-2-one.

85. The method of embodiment 15 wherein the monomer mixture further comprises a fast reacting hydrophilic monomer.

86. The method of embodiment 85 wherein the fast reacting hydrophilic monomer is selected from the group consisting of unsaturated carboxylic acids, acrylic substituted alcohols, acrylamides and mixtures thereof.

87. The method of embodiment 85 wherein the fast reacting hydrophilic monomer is selected from the group consisting of methacrylic acid, acrylic acid, 2-hydroxyethyl methacrylate, 2-hydroxyethyl acrylate, methacrylamide, N,N-dimethylacrylamide (DMA), N-isopropylacrylamide (NIPAM) and mixtures thereof.

88. The method of embodiment 85 wherein the fast reacting hydrophilic monomer is present at between 25 to 60 percent by weight.

89. The method of embodiment 85 wherein the fast reacting hydrophilic monomer is present at between 30 to 50 percent by weight.

90. The method of embodiment 85 wherein the fast reacting hydrophilic monomer is present at between 35 to 45 percent by weight.

91. The method of embodiment 83 wherein the slow reacting hydrophilic monomer is present at between 25 to 65 percent by weight.

92. The method of embodiment 83 wherein the slow reacting hydrophilic monomer is present at between 30 to 55 percent by weight.

93. The method of embodiment 83 wherein the slow reacting hydrophilic monomer is present at between 35 to 45 percent by weight.

94. The method of embodiment 50 wherein the monomeric mixture further comprises at least one slow reacting hydrophilic monomer, at least one ethylenically unsaturated hydrophobic monomer and an organic diluent and comprising a combined step of shaping and polymerizing by a method step selected from the group consisting of static casting and spin casting.

95. The method of embodiment 94 further comprising a step of exposing the polymerized materials to a solvent selected from the group consisting of water, 2-propanol, etc. and mixes thereof.

96. The method of embodiment 94 further comprising a step of autoclaving the polymerized material in water or buffer solution 97. The UV blocking contact lens of embodiment 58 having a Wilhelmy Plate area loop of between 0.91 and 1.83.

98. The UV blocking silicone hydrogel contact lens of embodiment 62 having a Wilhelmy Plate area loop of between 0.91 and 1.83.

Having thus described the inventive concepts and a number of exemplary embodiments, it will be apparent to those skilled in the art that the invention may be implemented in various ways, and that modifications and improvements will readily occur to such persons. Thus, the embodiments are not intended to be limiting and presented by way of example only. The invention is limited only as required by the following claims and equivalents thereto.

What is claimed is:

1. A UV blocking contact lens blocking more than 70% UVA light and 95% UVB light, containing entrained PVP and having a water content of 42.3% to 59.1% when fully hydrated, wherein the lens is formed from a reaction mixture comprising at least N-vinylpyrrolidone and at least one other comonomer and a free-radical polymerizable, substituted or unsubstituted, Bis O-hydroxybenzophenone, wherein PVP is formed in situ during cure of the reaction mixture.

2. The UV blocking contact lens of claim 1 having a receding contact angle of about 21.

3. The UV blocking contact lens of claim 1 having an advancing contact angle of between about 29 and about 33.

4. A UV blocking silicone hydrogel contact lens blocking UV light more than 70% UVA light and 95% UVB light, containing entrained PVP and having a having a water content of 42.3% to 59.1% when fully hydrated, wherein the lens is formed from a reaction mixture comprising at least N-vinylpyrrolidone and at least one other comonomer and a free-radical polymerizable, substituted or unsubstituted, Bis O-hydroxybenzophenone, wherein PVP is formed in situ during cure of the reaction mixture.

5. The UV blocking silicone hydrogel contact lens of claim 4 and having a receding contact angle of about 21.

6. The UV blocking silicone hydrogel contact lens of claim 4 and having an advancing contact angle of between about 29 and about 33.

7. The UV blocking silicone hydrogel contact lens of claim 4 wherein the Bis O-hydroxybenzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

8. The UV blocking silicone hydrogel contact lens of claim 7 having a receding contact angle of about 21.

9. The UV blocking silicone hydrogel contact lens of claim 8 having an advancing contact angle of between about 29 and about 33.

10. The UV blocking contact lens of claim 1 wherein the Bis O-hydroxybenzophenone is selected from the group consisting of 1,3-Bis(4-benzoyl-3-hydroxyphenoxy)-2-propyl acrylate and 1,3-Bis(4-benzoyl-3-hydroxyphenoxy)-2-propyl methacrylate and mixtures thereof.

11. The UV blocking contact lens of claim 10 having a receding contact angle of about 21.

12. The UV blocking contact lens of claim 11 having an advancing contact angle of between about 29 and about 33.

* * * * *